(12) United States Patent
Mon et al.

(10) Patent No.: US 8,301,564 B2
(45) Date of Patent: Oct. 30, 2012

(54) INTERACTING WITH USER AT ATM BASED ON USER PREFERENCES

(75) Inventors: Felix A. Mon, Jacksonville, FL (US); Timothy James Mark, Berkeley, CA (US); Jason Michael Ackiss, Matthews, NC (US); Maile George, Concord, CA (US); Robert Fleetwood Armstrong, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 12/695,870

(22) Filed: Jan. 28, 2010

(65) Prior Publication Data

US 2011/0184865 A1  Jul. 28, 2011

(51) Int. Cl.
*G06Q 40/00* (2012.01)
(52) U.S. Cl. .......................................................... 705/43
(58) Field of Classification Search ...................... 705/43
See application file for complete search history.

(56) References Cited

U.S. PATENT DOCUMENTS

| | | | | |
|---|---|---|---|---|
| 6,154,879 | A * | 11/2000 | Pare et al. | 705/35 |
| 7,194,414 | B1 * | 3/2007 | Savage et al. | 705/64 |
| 7,494,050 | B1 * | 2/2009 | Bowen et al. | 235/379 |
| 7,644,039 | B1 * | 1/2010 | Magee et al. | 705/43 |
| 2002/0198839 | A1 * | 12/2002 | Uozumi et al. | 705/45 |
| 2007/0205271 | A1 * | 9/2007 | Gaillard et al. | 235/381 |
| 2010/0332388 | A1 * | 12/2010 | Rielly et al. | 705/43 |

OTHER PUBLICATIONS

Web link: http://www.reghardware.co.uk/2009/05/25/handset_apps_for_blind/print.html, Phone Apps Help Blind 'see'(video), 2 pages.
Web link: http://www.knfbreader.com/products-mobile.php; "knfbReader Mobile", 2 pages.
Web link: http//www.maccast.com/2009/07/01/maccast-2009-07-01-iphone-3gs-accessibility/; 6 pages.
Website: http://www.snaptell.com/; 1 page.
Hackman, Mark, "Hands Off with Google Goggles", Dec. 8, 2009, Web link: http://www.pcmag.com/article2/0,2817,2356786,00.asp; 4 pages.
Web link: http://braillebookstore.com/view.php?T=Pocket+Money+Brailler, Product = Pocket Money Brailler; 2 pages.
Pickens, Hugh, "BrainPort Lets the Blind 'See' With Their Tongues"; Web link: http://hardware.slashdot.org/article.pl?sid=09/08/22/2035256; 3 pages.
Caesar, "New Graphic Displays for the Blind", Dec. 22, 2004; Web link: http://www.physorg.com/news2474.html.

(Continued)

*Primary Examiner* — James Vezeris
(74) *Attorney, Agent, or Firm* — Michael A. Springs; Moore & Van Allen, PLLC; Padowithz Alce

(57) ABSTRACT

Embodiments of the present invention provide apparatuses, methods, and computer program products that allow for interaction with a user at an automated teller machine (ATM) based on pre-established user preferences. For example, an ATM is provided having: (1) a user interface configured to receive user identifying information from a user; and (2) a processing device operatively coupled to the user interface and configured to use the user identifying information to determine a pre-established user preference, wherein the processing device is further configured to use the user interface to interact with the user based at least partially on the pre-established user preference.

49 Claims, 9 Drawing Sheets

OTHER PUBLICATIONS

Website: http://maxiaids.com/store/prodIndex.asp?idStore=1 [Products for Independent Living: Blind & Low Vision Store]; 2 pages.

MacDonald, Jay (Bankrate.com), "Changes to Currency May Help the Blind", Oct. 13, 2008 Web link: http://bankrate.com/finance/checking/changes-to-currency-may-help-the-blind-1.aspx; 2 pages.

MacDonald, Jay (Bankrate.com), "Changes to Currency May Help the Blind", Oct. 13, 2008 Web link: http://bankrate.com/yho/news/pf/20081013_blind_currency_changes_a2.asp; 2 pages.

O'Brien, Maggie and Jordon, Steve (Omaha World-Herald), "No Single Solution to Blind-Friendly Currency", May 21, 2008, web link: http://www.acb.org/nebraska/legislation/accessible-currency/news-articles/no-single-solution-to-blind-friendly-currency.html; 5 pages.

Web link: www.halfbakery.com/idea/blind_20friendly_20currency; Blind Friendly Currency, 15 pages.

Website: www.acb.org/resources/index.html; American Council of the Blind Helpful Resources for Blind and Visually Impaired Persons, 4 pages.

Web link: www.abledata.com/abledata.cfm?pageid=19327&top=14673&trail=22,13134&discontinued=0, Products: Voice Output Paper Money Identifier, 2 pages.

Vicini, James (Washington, D.C.), "U.S. Court: Currency Discriminates Against the Blind", May 20, 2008, Web Link: http://www.reuters.com/article/idUSN2030825720080520, 3 pages.

eHow Contributing Writer, Web link: http://www.ehow.com/how_2043858_help-blind-arrange-currency-their.html, 2 pages.

Web link: http://en.wikipedia.org/wiki/Wired_glove [Wired Glove Information]; 3 pages.

* cited by examiner

INTERACTING WITH USER AT ATM BASED ON USER PREFERENCES

FIELD

In general, embodiments of the invention relate to automated teller machine systems, and, more particularly, some embodiments relate to devices, methods, and computer program products that allow for interaction with a user at an automated teller machine based on pre-established user preferences.

BACKGROUND

Often times it can be difficult for the blind or visually impaired (collectively, "visually impaired") to distinguish between different denominations of currency. This is particularly true for paper bills where the different denominations are all the same size and shape. For example, currently in the United States the one-dollar bill, five-dollar bill, ten-dollar bill, twenty-dollar bill, hundred-dollar bill, etc., are all the same size and shape and are only readily distinguishable by sight. In other words, the various bills in the United States currency (and other similar currencies) can be indistinguishable to someone that is blind or otherwise visually impaired. Therefore, systems and methods are needed to help the visually impaired and/or others to be able to identify and distinguish between various denominations of currency, particularly paper bills used as currency. Furthermore, businesses are always trying to improve customer relationships by addressing each particular customer's needs and, as such, systems and methods are needed for improving and customizing a customer's experience in new and unique ways.

SUMMARY

Embodiments of the present invention address these and/or other needs by providing an automated teller machine (ATM) system that allows ATMs to interact with a user based on pre-established user preferences of the particular user. For example, some embodiments of the present invention provide currency solutions for the visually impaired by, for example, providing ATMs that are configured to identify whether a user has a visually impaired preference associated with the user or the user's payment device and then perform certain procedures at the ATM based on this preference. For example, based on such a user preference, the ATM may be configured to perform such procedures as: using audible signals to indicate denomination of dispensed bills, dispensing only a user-preferred denomination of bill, folding bills based on denomination, and/or the like.

In other embodiments of the invention, other preferences may exist such as, but not limited to, user preferences for options presented to the user at an ATM. For example, in one embodiment a user that almost always withdraws the same amount of money from an ATM can create a user preference that causes the ATM to offer such a withdrawal amount as the very first option presented to the user after the user is authenticated at the ATM. In other words, in some embodiments of the invention the user can customize the options presented by the ATM, the order in which options are presented, the format in which options are presented, and/or the like.

More particularly, some embodiments of the invention provide an ATM having: (1) a user interface configured to receive user identifying information from a user; and (2) a processing device operatively coupled to the user interface and configured to use the user identifying information to determine a pre-established user preference, where the processing device is further configured to use the user interface to interact with the user based at least partially on the pre-established user preference. In some embodiments, the ATM further includes a network communication interface, where the processing device is configured to use the user identifying information to determine the pre-established user preference by communicating with a remote computing device based on the user identifying information and obtaining the pre-established user preference from the remote computing device. In some embodiments, the processing device is configured to use the user identifying information to determine the pre-established user preference by reading the pre-established user preference in the user identifying information. In some embodiments, the user identifying information comprises information received from a transaction device, such as a bank card or mobile phone, held by the user. In some embodiments, the user identifying information includes biometrics of the user. In some embodiments, the user identifying information comprises information identifying a financial account associated with the user. In some embodiments, the pre-established user preference is defined by the user.

In some embodiments of the ATM, the ATM further includes: (1) a cash repository having cash stored therein, and (2) a cash dispenser configured to dispense cash stored in the cash repository, wherein the processing device is configured to use the cash dispenser to dispense cash based on the pre-established user preference.

In some embodiments of the ATM, the ATM further includes: (1) a cash repository comprising a plurality of different denominations of cash stored therein; and (2) a cash dispenser configured to dispense the different denominations of cash stored in the cash repository, wherein the processing device is configured to use the cash dispenser to dispense only a single denomination of cash to the user based on the pre-established user preference.

In some embodiments of the ATM, the ATM further includes: (1) a cash repository comprising a plurality of different denominations of cash stored therein; and (2) a cash dispenser configured to dispense the different denominations of cash stored in the cash repository, wherein the processing device is configured to use the cash dispenser to dispense the different denominations of cash in a particular order based on the pre-established user preference.

In some embodiments of the ATM, the ATM further includes: (1) a cash repository comprising cash stored therein; and (2) a cash dispenser configured to dispense cash stored in the cash repository, wherein the user interface comprises an audio output device, and wherein the processing device is configured to use the audio output device to generate an audio signal based on the pre-established user preference and a denomination of the cash dispensed by the cash dispenser.

In some embodiments of the ATM, the ATM further includes a memory comprising: (1) a first set of user interface instructions configured to instruct the processing device to use the user interface according to a first set of rules, and (2) a second set of user interface instructions configured to instruct the processing device to use the user interface according to a second set of rules different from the first set of rules, wherein the processing device is configured to use the second set of user interface instructions instead of the first set of user interface instructions based at least partially on the pre-established user preference. In some such embodiments, the pre-established user preference indicates a visual impairment, wherein the first set of user interface instructions comprise a default set of user interface procedures, and wherein the second set of user interface instructions comprise a set of user interface procedures tailored for a visually impaired user.

In some embodiments of the ATM, the processing device is configured to use the user interface to interact with the user based at least partially on the pre-established user preference by initiating an authentication procedure based on the pre-established user preference. In some embodiments of the ATM, the processing device is configured to use the user interface to interact with the user based at least partially on the pre-established user preference by attempting to communicate with the user's personal device based on the pre-established user preference. In some embodiments of the ATM, the processing device is configured to use the user interface to interact with the user based at least partially on the pre-established user preference by presenting the user with options in an order based on the pre-established user preference. In some embodiments of the ATM, the processing device is configured to use the user interface to interact with the user based at least partially on the pre-established user preference by dispensing bills to the user having an altered physical configuration based on the pre-established user preference. In some embodiments of the ATM, Some embodiments of the invention provide a method involving, for example: (1) receiving electronic identifying information obtained by an automated teller machine; (2) using the electronic identifying information to identify a user or an account; (3) identifying a pre-established user preference associated with the user or the account; and (4) interacting with the user at the automated teller machine based at least partially on the pre-established user preference.

Some embodiments of the invention provide a computer program product having computer-readable medium, the computer-readable medium having computer-executable program code stored therein, where the computer-executable program code includes: a first executable code portion configured to receive electronic identifying information obtained by an automated teller machine; a second executable code portion configured to use the identifying information to identify a pre-established user preference; and a third executable code portion configured to interact with the user at the automated teller machine based at least partially on the pre-established user preference.

Some embodiments of the invention provide an apparatus comprising: (1) a user interface configured to communicate with a user; (2) a memory having account information for the user stored therein; and (3) a processor communicably coupled to the user interface and the memory, wherein the processor is configured to use the user interface to prompt the user to enter or select one or more user preferences that indicate the user's preferences for interacting with an automated teller machine, wherein the processor is configured to receive an indication of one or more user preferences entered or selected by the user, wherein the processor is configured to store one or more user preferences in the memory based on the indication of one or more user preferences entered or selected by the user, and wherein the processor is configured to associate the one or more user preferences in the memory with the account information for the user.

Some embodiments of the invention provide an ATM having: (1) a user input device configured to receive user input from the user; (2) a cash dispensing device configured to dispense currency to a user based at least partially on the user input, wherein each piece of currency has a denomination; and (3) a speaker device configured to produce an audible sound based on the denomination of the currency that the cash dispensing device dispenses. In one embodiment, the audible sound is the sound of a human or human-like voice stating the denomination of the currency that the cash dispensing device dispenses. In some embodiments, the audible sound is based at least partially on user preferences associated with the user. In some embodiments, the cash dispensing device is configured to dispense currency to the user one bill at a time, and wherein the speaker device is configured to produce the audible sound each time a bill is dispensed based on the denomination of the bill being dispensed. In some embodiments, the cash dispensing device is configured to dispense currency grouped by denomination, and wherein the speaker device is configured to produce the audible sound each time a group of bills is dispensed based on the denomination of the group of bills being dispensed.

The features, functions, and advantages that have been discussed and other features, functions, and advantages may be achieved independently in various embodiments of the present invention or may be combined with yet other embodiments, further details of which can be seen with reference to the following description and drawings.

BRIEF DESCRIPTION OF THE DRAWINGS

Figure 1:
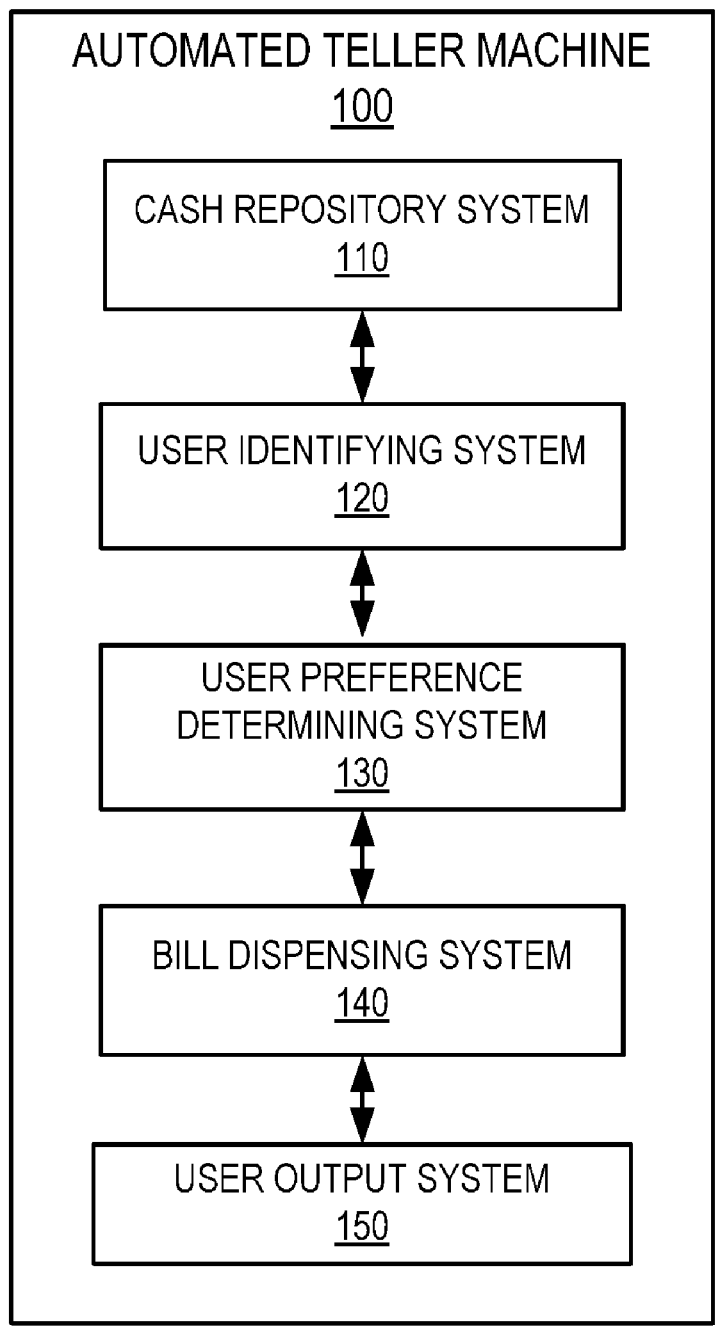
Figure 2:
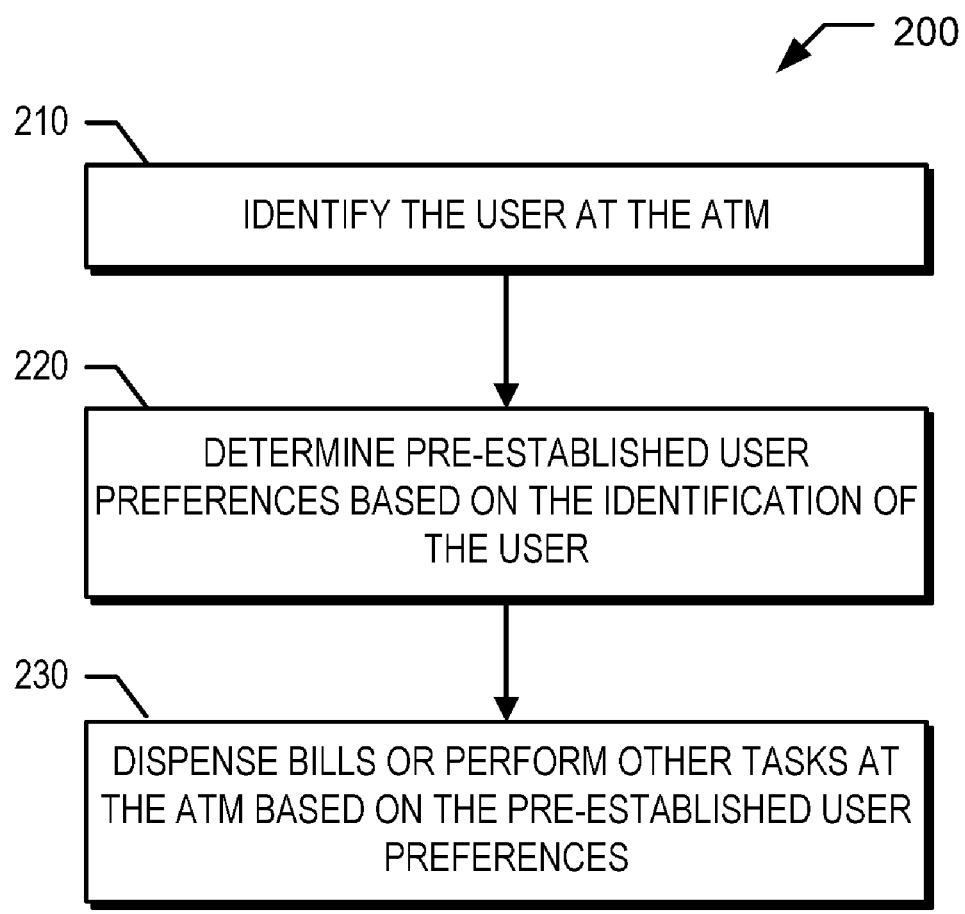
Figure 3:
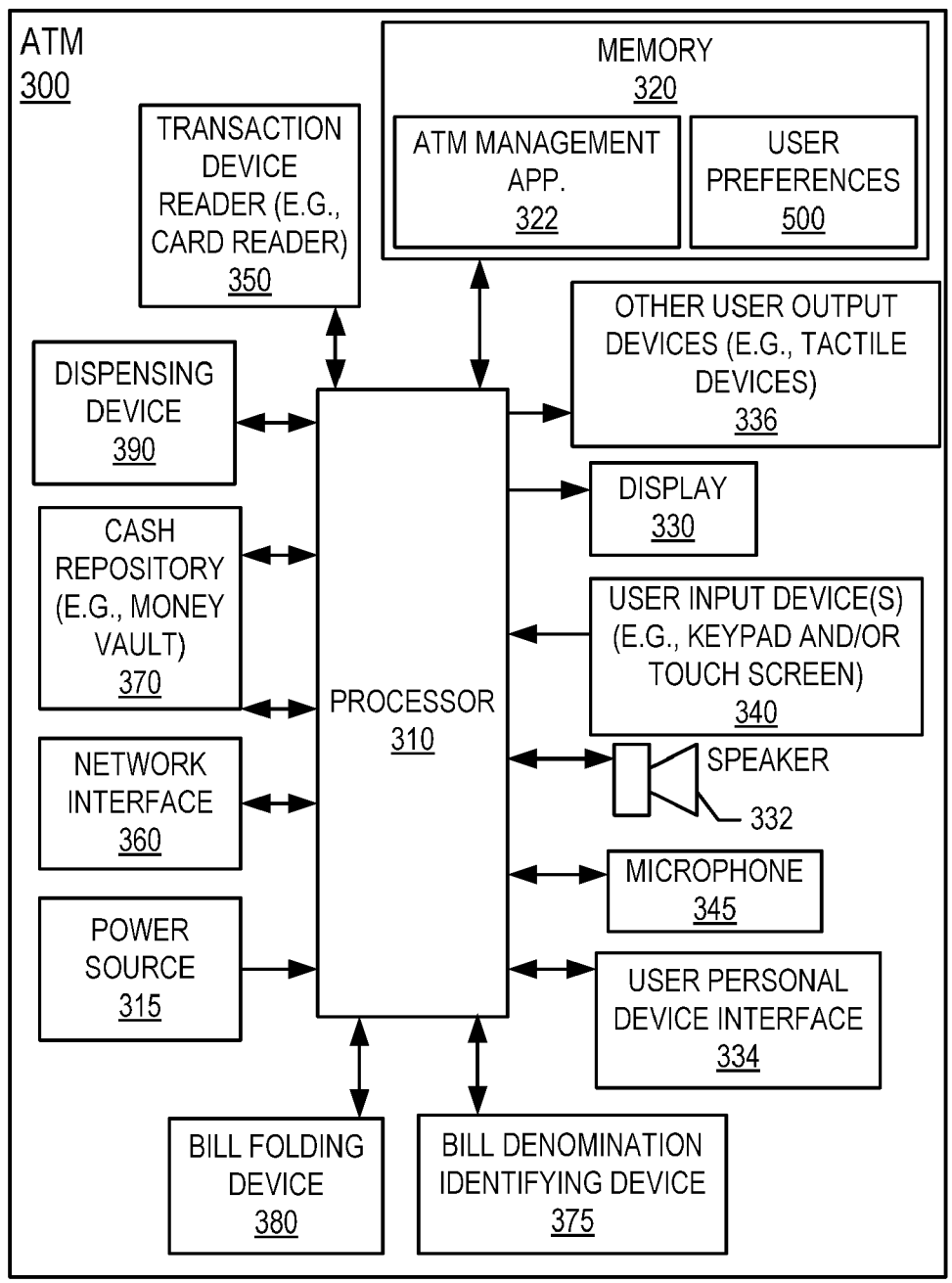
Figure 4:
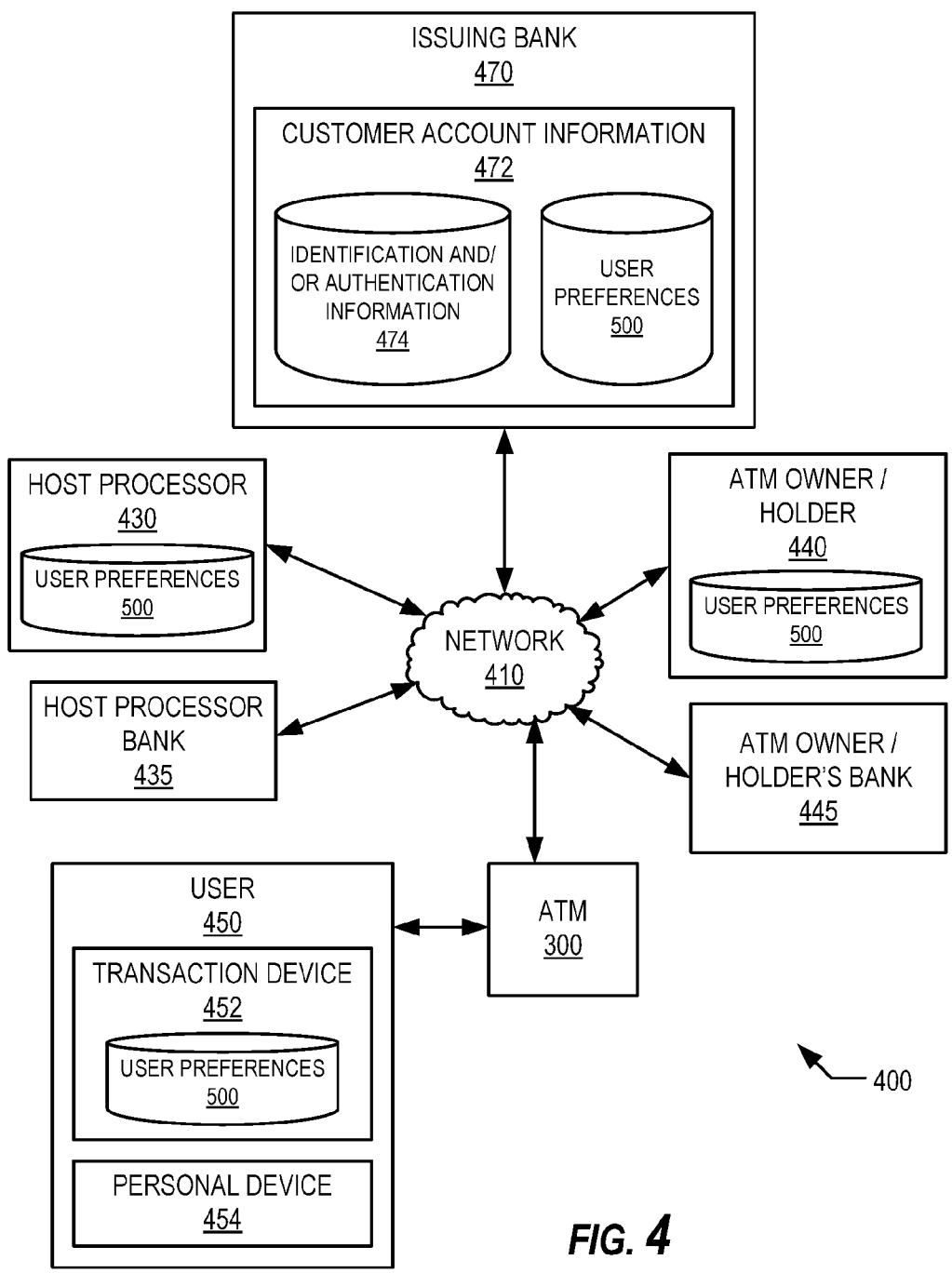
Figure 5:
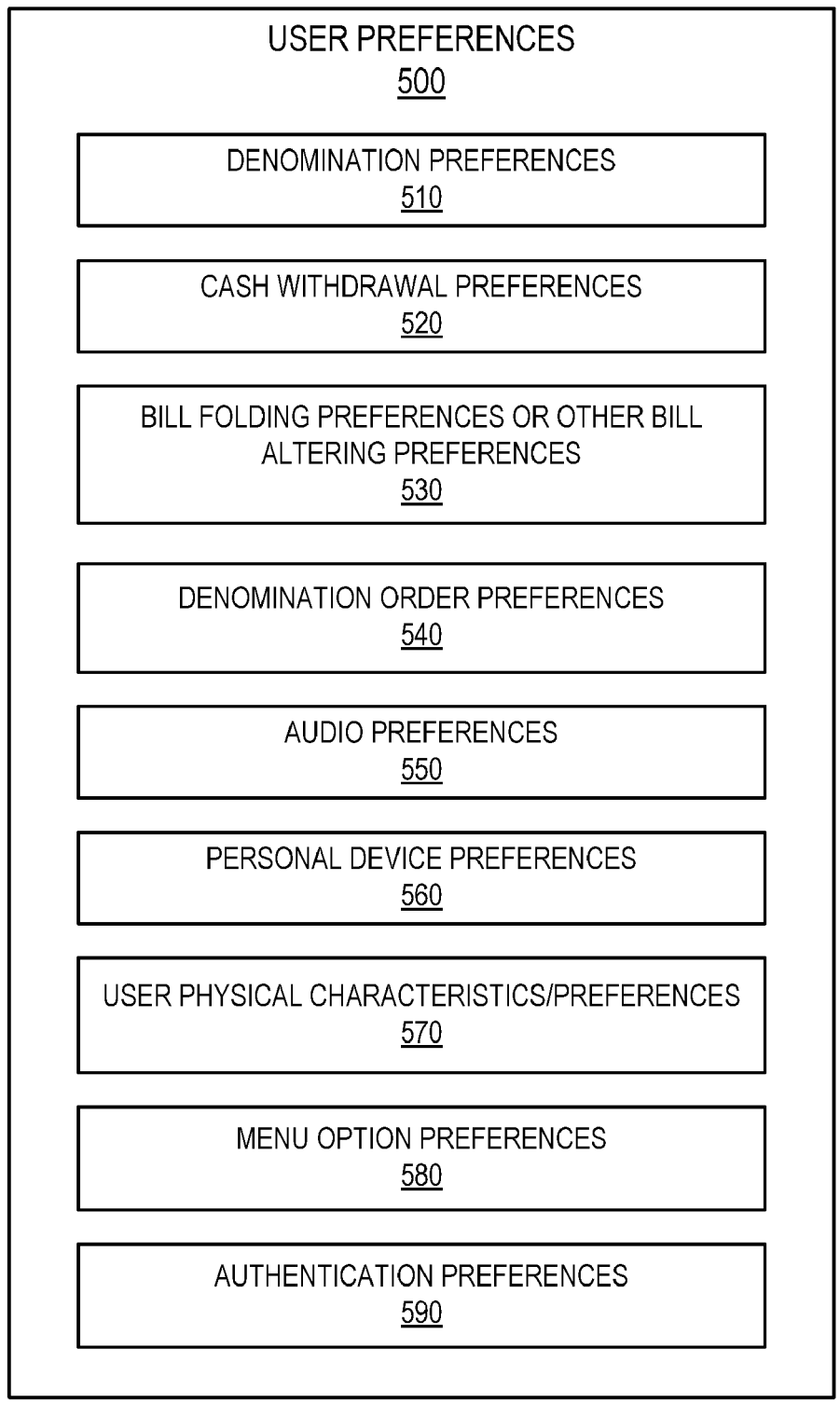
Figure 6:
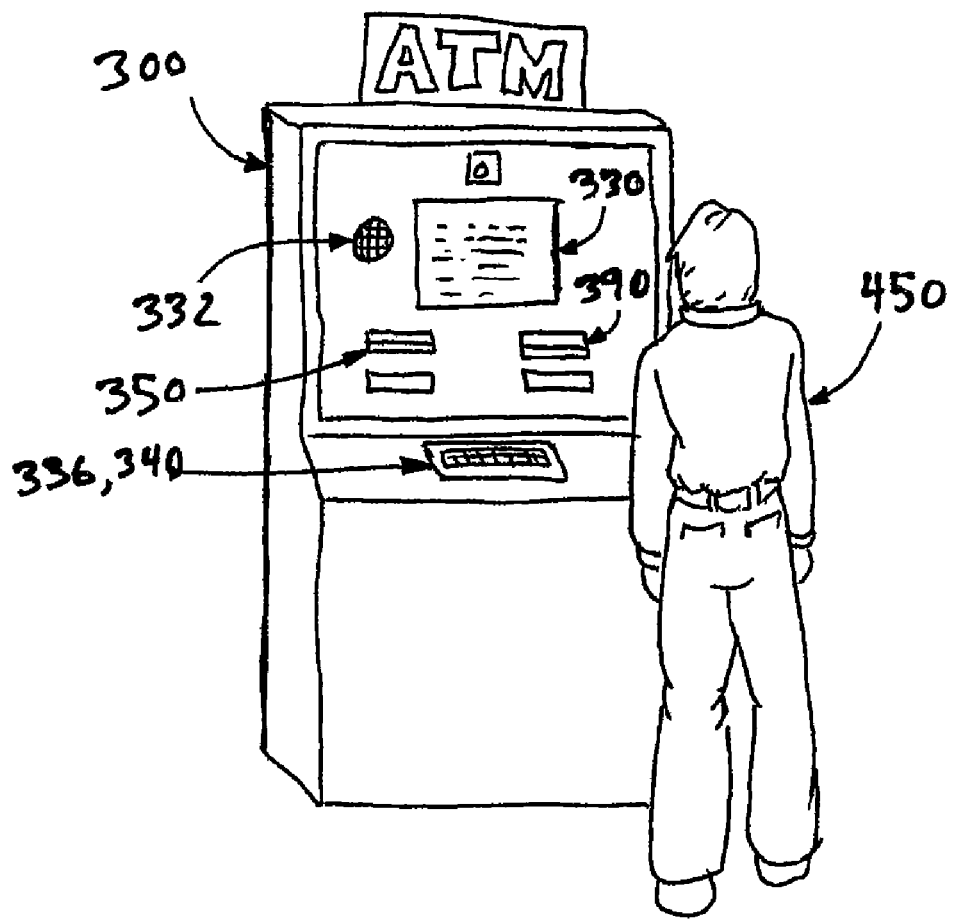
Figure 7:
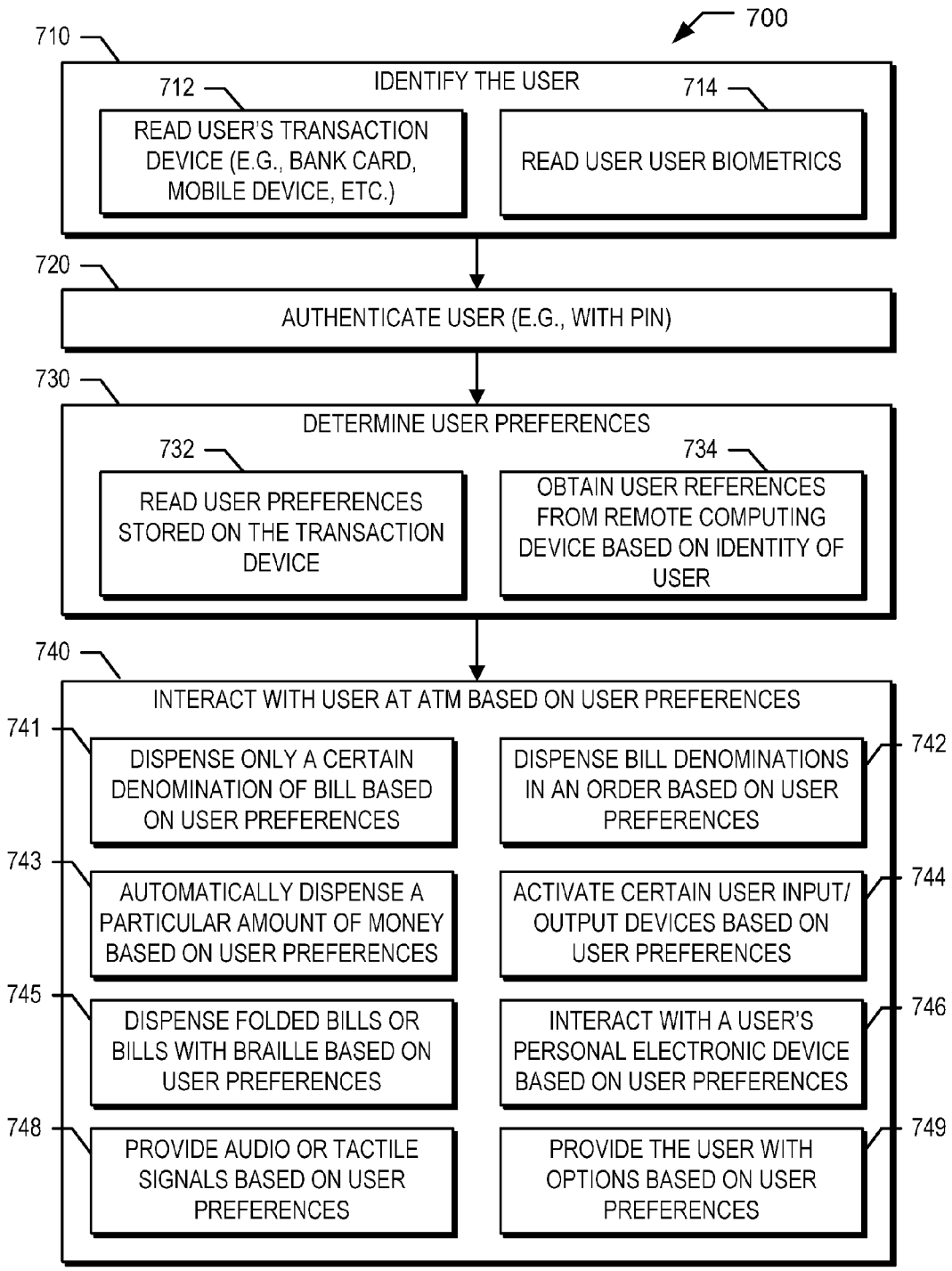
Figure 8:
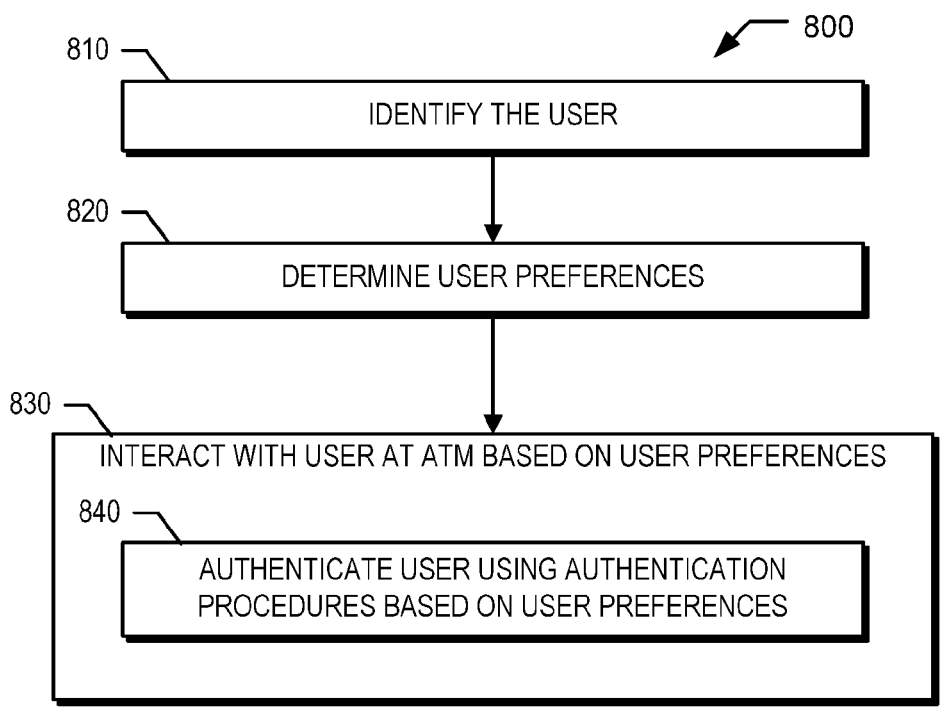
Figure 9:
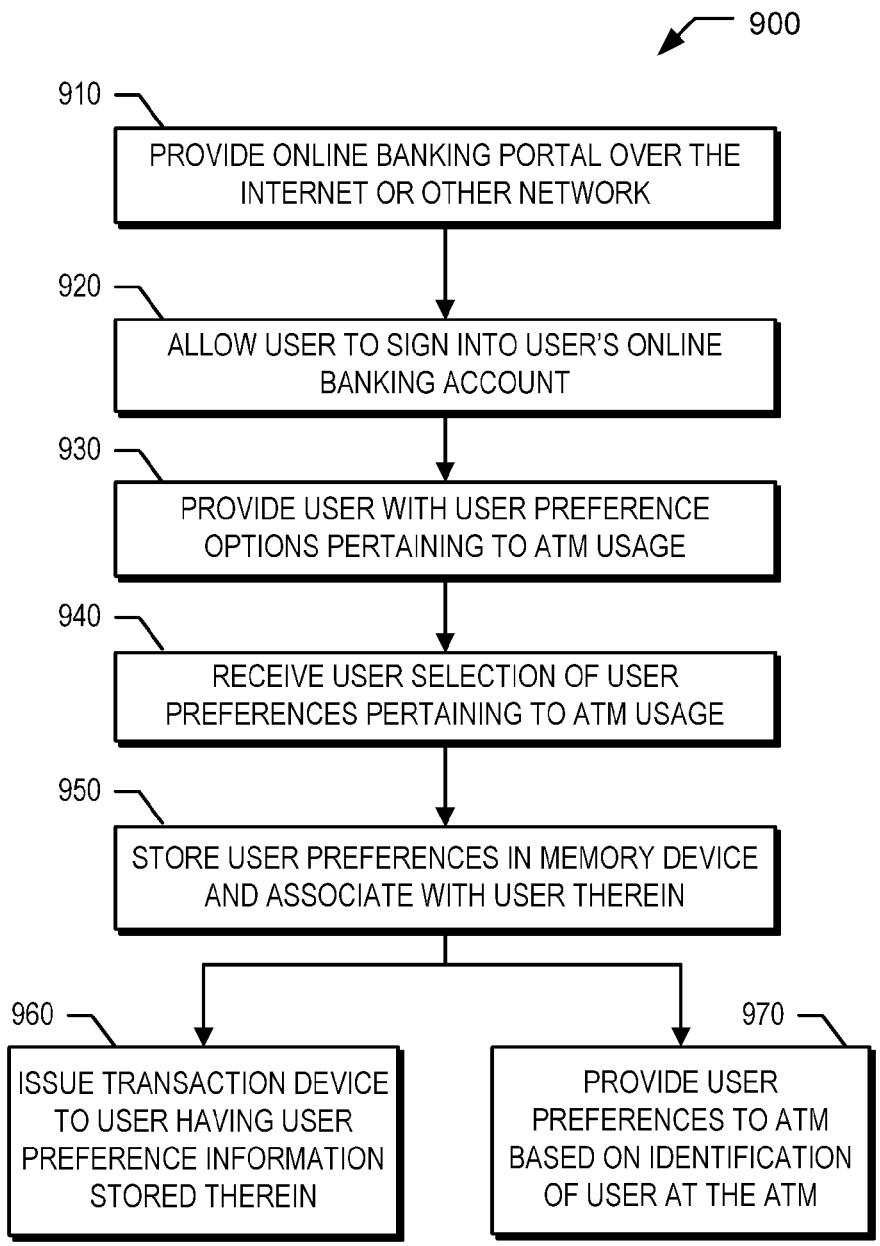

Having thus described embodiments of the invention in general terms, reference will now be made to the accompanying drawings, wherein:

FIG. 1 provides a block diagram illustrating an ATM, in accordance with an embodiment of the invention;

FIG. 2 provides a flow diagram illustrating a process of interacting with a user of an ATM, in accordance with an embodiment of the present invention;

FIG. 3 provides a block diagram illustrating a more detailed illustration of an ATM, in accordance with an embodiment of the invention;

FIG. 4 provides a block diagram illustrating an exemplary ATM support system and environment, in accordance with an embodiment of the invention;

FIG. 5 provides an illustration of exemplary user preferences, in accordance with an embodiment of the invention;

FIG. 6 provides an illustration of a user at an ATM, in accordance with an embodiment of the invention;

FIG. 7 provides a flow diagram illustrating a process of interacting with a user at an ATM based on pre-established user preferences, in accordance with an embodiment of the invention;

FIG. 8 provides a flow diagram illustrating another process of interacting with a user at an ATM based on pre-established user preferences, in accordance with an embodiment of the invention; and FIG. 9 provides a flow diagram illustrating a process of establishing a user's ATM preferences, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, a "transaction device" refers to any device that is configured to hold and/or communicate information, such as account identification information, used by a user during a transaction. For example, a transaction device may include: a bank card having a magnetic stripe, smart card technology, or other information-storage technology; a near field communication (NFC) device such as a specially-configured cell phone; a radio-frequency identification tag; and/or the like. As used herein, a "bank card" refers to a credit card, debit card, ATM card, check card, or the like, and a "bank account" refers to a credit account, debit account, deposit account, checking account, investment account, or the like. Although the phrases "bank card" and "bank account" include the term "bank," the card need not be issued by a bank, and the account need not be maintained by a bank and may instead be issued by and/or maintained by other financial institutions. As used herein, unless specifically limited by the context, the term "transaction" may refer to a purchase of goods or services, a withdrawal of funds, a deposit of funds, an electronic transfer of funds, a payment transaction, a credit transaction, or other transaction involving a financial account.

FIG. 1 provides a block diagram illustrating an ATM 100, in accordance with an embodiment of the invention. FIG. 2 provides a flow diagram illustrating a process 200 performed by, for example, the ATM of FIG. 1, in accordance with an embodiment of the present invention.

As illustrated in FIG. 1, in one embodiment of the invention, the ATM 100 has a cash repository system 110, a user identifying system 120, a user preference determining system 130, a bill dispensing system 140, and a user output system 150. Although FIG. 1 illustrates each of these systems as separate and distinct systems, it will be appreciated that, in some embodiments, the separation is merely conceptual and two or more of these systems can share one or more devices to perform each system's respective functions.

The ATM 100 is generally configured to help a user to perform various tasks with regard to one or more of the user's financial accounts. For example, the ATM 100 may be configured to allow a user to withdraw money from the user's account, deposit money or checks into the user's account, cash one or more checks, transfer money from the user's account to another account, view the balance or other information about the user's account, make bill payments using the user's account, and/or perform other tasks involving the user's financial account. The user's financial account may include, for example, a savings account, deposit account, checking account, money market account, demand deposit account, investment account, and/or the like.

To accommodate cash withdrawals and/or deposits, the ATM 100 generally has one or more bills stored in the cash repository system 110. As used herein, the terms "bill" and "cash" refer to any form of currency, such as paper currency. For example, in one embodiment a bill is a United States one-dollar bill, five-dollar bill, ten-dollar bill, twenty-dollar bill, fifty-dollar bill, hundred-dollar bill, or the like. In other embodiments, the bill is another flat, rectangular, paper-based currency. In one embodiment, the cash repository system 110 is a safe or vault of the ATM configured to hold many bills of a single denomination or of different denominations. The bills may be placed into the cash repository system 110 periodically by a person having authority to open the cash repository system 110. In some embodiments, some or all of the bills may be placed into the cash repository system 110 by various users depositing cash into the ATM 100.

As illustrated by block 210 in FIG. 2, in one embodiment of the invention the user of the ATM 100 is identified and authenticated. For example, in one embodiment, the user identifying system 120 of the ATM 100 performs steps to identify a user presently at the ATM 100. In one embodiment of the ATM 100, the user identifying system 120 includes a device configured to read information stored on a transaction device held by the user. As described above, the transaction device may be, for example, a bank card (e.g., a credit card or debit card) with a magnetic stripe, barcode, radio-frequency identification (RFID) tag, smart chip, and/or other communication system, a NFC device such as a NFC-enabled cell phone, and/or any other device capable of storing machine-readable information therein. In this regard, the user identifying system 120 may include a transaction device reader such as a card reader (e.g., a magnetic stripe reader), a RFID transceiver, a NFC transceiver, a barcode reader, an infrared scanner, and/or the like.

In some embodiments, the user identifying system 120 further includes a network communication interface configured to communicate information read from the user's transaction device to a remote server and receive an authentication decision back from the remote server. The authentication decision indicates whether the identity of the user has been authenticated and whether the user is authorized to one or more particular financial accounts.

In some embodiments, the user identifying system 120 further includes other user input and output devices that ask the user to enter other information into the ATM 100, such as a personal identification number (PIN) or answers to one or more security questions. In such embodiments, this information may be sent to the remote server along with information read from the user's transaction device. The remote server then uses the information received from the ATM 100 and compares it to information stored in its own memory to determine the whether the user can be authenticated as a person authorized to use the financial account(s) associated with the user's transaction device.

In other embodiments of the invention, the user identifying system 120 is configured to use biometrics to identify and authenticate the user, such as the user's fingerprint, handprint, iris, face, or other physical feature. As such, in some embodiments of the invention, the user identifying system 120 includes a biometric scanning device, such as an iris scanner, facial scanner, fingerprint scanner, or other scanning/imaging device. In such embodiments, information read by the biometric scanner is then sent to a remote server where it is compared to a database of known biometric information to determine the identity of the user and whether the identified user is associated with the financial account to be accessed.

As illustrated by block 220 in FIG. 2, pre-established user preferences are then identified based on the identification of the user. For example, in one embodiment, the ATM 100 includes a user preference determining system 130 for determining user preferences of the user. In one embodiment of the invention, the user preference determining system 130 uses a transaction device reader to read certain pre-established user preferences stored on the transaction device. In still other embodiments of the invention, the user preference determining system 130 uses a network communication interface to send information about the identity of the user or the user's account to a remote server. The remote server then associates this information with certain pre-established preferences stored in its memory, the pre-established preferences being associated in the memory with certain user's or user accounts. The remote server then responds by sending user-preferences to the user preference determining system 130 of the ATM 100. In some embodiments of the invention the user preferences are determined before authentication of the user, while in other embodiments of the invention the user preferences are determined after or concurrently with authentication of the user.

As illustrated by block 230 in FIG. 2, once the ATM 100 determines the pre-established user preferences associated with the current user, the ATM 100 then dispenses bills or performs other tasks based on the pre-established user preferences. As used herein, the term "based on" means "based at least partially on" and it will be understood that, unless stated otherwise, when the ATM 100 performs a task based on a pre-established user preference, it may also be based on other factors in addition to the user preferences.

In one example embodiment of the invention, the bill dispensing system 140 of the ATM 100 dispenses bills based on the user preferences. For example, in one embodiment, the bill dispensing system 140 only dispenses a certain denomination of bill to the user based on a user's pre-established preferred bill denomination. Such an embodiment of the invention may be useful to a user having a visual impairment since the user could then always know the denomination of bill being dispensed by the ATM 100. In some such embodiments of the invention, if the user's preferred denomination is not available at the ATM, the ATM may be further configured to alert the user audibly and, in some cases, may provide the user with an option to proceed with another denomination.

In another embodiment of the invention, the bill dispensing system 140 dispenses denominations of bills in a particular order based on the user's preference. In yet another embodiment of the invention, the bill dispensing system 140 is configured to fold bills being dispensed based on pre-established user preferences. For example, U.S. patent application Ser. No. 12/695,867, filed concurrently herewith and assigned to the assignee of the present application, is incorporated herein by reference in its entirety and describes an ATM configured to fold bills or otherwise physically configure bills being dispensed so that different denominations of bills can be distinguished tactilely.

In still other embodiments of the invention, the ATM's user output system 150 is configured to interact with the user in a non-standard way based on the user preferences. For example, the ATM 100 may be configured to make certain audible sounds that it normally does not make based on a user preference that indicates that a current user is visually impaired or otherwise prefers to receive audible communication from the ATM 100. For example, the ATM 100 may indicate a sound whenever cash is dispensed and, in some embodiments, may make a different sound for each denomination of bill being dispensed. In some embodiments, the sounds may be a human-sounding voice speaking the denomination of each bill or group of bills as they are dispensed. In some embodiments, the sounds themselves can be customized based on user preferences.

In some embodiments, the ATM 100 may communicate with a user's personal mobile device based on user preferences or may allow for voice commands or provide tactile output. In some embodiments, the ATM 100 may alter its options displayed on its display screen based on pre-established user preferences that indicate a user's preferred options and transactions. These and other examples of user preferences are described herein below with reference to FIGS. 3-9.

FIG. 3 provides a more detailed illustration of an exemplary embodiment of an ATM 100, in accordance with one embodiment of the invention. More particularly, FIG. 3 provides a block diagram illustrating an ATM 300, in accordance with one embodiment of the present invention. While several embodiments of an ATM 300 are described herein for purposes of example, other types of ATMs or cash dispensers can readily be configured to employ embodiments of the present invention.

As illustrated in FIG. 3, the ATM 300 includes a processor 310. It is understood that the processor 310 includes circuitry used for implementing audio, visual, and/or logic functions of the ATM 300. For example, the processor 310 may be comprised of a digital signal processor device, a microprocessor device, and various analog-to-digital converters, digital-to-analog converters, and other support circuits. Control and signal processing functions of the ATM 300 are allocated between these devices according to their respective capabilities. The processor 310 may include functionality to operate one or more software programs based on computer-readable instructions thereof, which may be stored in the memory 320. In one embodiment of the invention, the memory 320 includes an ATM management application 322 stored therein having computer executable program code for instructing the ATM 300 to perform certain procedures described herein, including instructions for using user preferences. In some embodiments of the invention, the memory 320 also includes user preferences 500 stored therein. The user preferences 500 may be stored permanently in the ATM 300 or may be stored in the ATM's memory 320 only temporarily after they are read from the user's transaction device or received from a remote server. In still other embodiments, the memory 320 includes the memory of a user's transaction device or other device that is inserted into or otherwise used by the ATM 300 to determine user preferences.

In general, the memory 320 is communicatively coupled to the processor 310. The memory 320 may include volatile memory, such as volatile Random Access Memory (RAM) including a cache area for the temporary storage of data. The ATM 300 may also include other non-volatile memory, which can be embedded and/or may be removable. The non-volatile memory can additionally or alternatively comprise an EEPROM, flash memory, or the like. The memory 320 can store any of a number of pieces of information and data used by the ATM 300 to implement the functions of the ATM 300. For example, the memory 320 can include an identifier, such as a serial number, capable of uniquely identifying the ATM 300 and/or the type of ATM 300.

The ATM 300 includes a communication interface including, for example, a network interface 360 and a user interface, operatively coupled to the processor 310. The network interface 360 may include a modem, server, or other electronic device that communicatively couples the ATM 300 to another electronic device or a network of devices, such as a local area network (LAN), a wide area network (WAN), and/or a global area network (GAN), such as the Internet or a payment network. The network interface 360 may be configured for wireless or wireline communication. The user interface comprises one or more user output devices, such as a display 330 and a speaker 332 or other audio device (e.g., a ringer, buzzer, or bell). The user interface may also include other user output devices such as tactile devices 336 that may include, for example, a Braille device or a vibrating device. The user interface further includes one or more user input devices 340, such as one or more keys or dials, a touch pad, keypad, touch screen, mouse, microphone 345, and/or the like.

The user interface may also include a user personal device interface 334 configured to communicate with a personal device possessed by the user. For example, in one embodiment the user can use his or her personal headphones to receive audio information from the ATM 300 or use his or her cell phone to receive information from and communicate information to the ATM 300. As such, in some embodiments, the user personal device interface 334 includes a connector, such as a headphone jack or a USB port, for making a wired connection to the user's personal device, and/or a wireless transceiver, such as a Bluetooth-enabled transceiver or other wireless transceiver, for making a wireless connection to the user's personal device.

The ATM 300 also includes a transaction device reader 350, such as a bank card reader or other device, for obtaining account identification information from a user's transaction device, such as a bank card. For example, a user's bank card may have a magnetic stripe encoded with account identification information, such as an account number. In such an example, the transaction device reader 350 includes a magnetic stripe reader for reading the account information encoded on the magnetic stripe. In other embodiments, the user's transaction device may include other types of machine-readable code, such as RF (radio frequency) code, barcode, two-dimensional barcode, optical code, infrared code, alphanumeric code, and/or the like. Likewise, the transaction device reader 350 may include other types of machine-readable code readers, such as an RF reader, a barcode scanner, an optical receiver, an infrared receiver, an imaging device coupled with character recognition software, a NFC transceiver, and/or the like.

The ATM 300 generally also includes a money safe/vault or other cash repository 370 and a cash dispensing device 390 for providing cash to the user during certain transactions. For example, in some embodiments, the cash repository 370 includes a plurality of cash cassettes for holding large sums of money for the ATM.

In some embodiments, the ATM 300 includes a bill denomination identifying device 375 configured to identify the denomination of a bill selected from the cash repository 370. Such a device may include one of many bill scanners or imagers available on the market. Some ATMs 300 are configured to receive cash deposits and use the bill denomination identifying device 375 to both determine denominations of deposited bills and determine denominations of bills to be folded or otherwise altered. In other embodiments, the bill denomination identifying device 375 is comprised of slots, bins, or other separators in the cash repository 370 that physically keep separate the different denominations of currency stored in the cash repository 370.

In some embodiments, the ATM 300 includes a bill folding device 380 configured to fold bills, such as flat rectangular paper bills. For example, in one embodiment, the bill folding device 380 is configured to make one or more folds in a bill. As will be apparent in view of this disclosure, the bill folding device 380 may include any paper folding technology available in the paper folding arts. In other embodiments, the ATM 300 may include other devices configured to alter the physical configuration/characteristics of the dispensed bill, such as a device configured to impress Braille characters to other tactile indicators into a paper bill or a device configured to place stickers onto a dispensed bill to create tactile denomination identifiers for the dispensed bills. In still other embodiments, other sensory systems are used such as applying a scent to a bill based on the denomination of the bill.

As further illustrated in FIG. 3, the ATM 300 includes a power source 315 for providing power to the various electronic components of the ATM 300. Other embodiments of the ATM 300 may include other devices and components not illustrated in FIG. 3.

FIG. 4 illustrates an ATM system and environment 400, in accordance with an embodiment of the invention. As illustrated in FIG. 5, the system 400 generally involves a user 450 holding a bank card or other transaction device 452 and, in some cases, a cell phone, headphones, headset, or other personal device 454. As described above, the transaction device 452 may be a credit card, debit card, ATM card, or other type of card that can be used to make a transaction involving an account maintained by an issuing bank 470. Although the invention is generally described herein as involving a bank card, other embodiments of the invention may involve other transaction devices 452 that can be used by a user 450 to make a transaction involving an account associated with the transaction device. For example, in one embodiment, instead of a card, the transaction device comprises a mobile telephone transmitting a radio frequency (RF) signal or other signal encoded with account identification information.

The transaction device 452 is associated with a particular user's account maintained by the issuing bank 470. The issuing bank 470 is the bank or other financial institution that maintains the user's financial account, which, as described above, may be a credit account, debit account, investment account, deposit account, or other account. As such, the issuing bank 470 is also, typically, the financial institution that issues the transaction device 452 or the information stored thereon. In this regard, the issuing bank 470 includes a memory system housing a datastore of user account information 472. The user account information 472 generally includes identification and/or authentication information 474, such as an account number, PIN or other authentication information, a user's name and contact information, and/or other identifiers. The user account information 472 also includes any user preferences 500 (described herein below in greater detail with regard to FIG. 5) that the user may have established with the issuing bank 470. The user account information 472 may also include other financial and non-financial information about the user and the user's account such as account balances, transaction information about previous transactions, and/or the like.

The issuing bank 470 generally also includes a network interface for communicating with the network 410, as well as a processor. In some embodiments, the issuing bank 470 includes a computer-based user preferences application stored in the memory system that includes computer-readable instructions for instructing the processor to perform one or more of the functions and procedures described herein with regard to FIGS. 7-9.

The system 400 generally also includes an ATM, such as the ATM 300 illustrated in FIG. 3. The ATM 300 is configured to communicate with the issuing bank 470 via a network 410. In one embodiment, the ATM 300 is owned, held, or otherwise associated with an ATM owner/holder 440. In one embodiment, the ATM owner/holder 440 is the issuing bank 470. For example, many banks have their own ATMs. In such an embodiment, the ATM 300 may communicate directly with the issuing bank 470 over the network 410 or through one or more other entities.

In other embodiments, however, the ATM owner/holder 440 is another bank or financial institution, a merchant, or the like. In such embodiments, the ATM 300 may communicate with the issuing bank 470 through the ATM owner/holder 440, the ATM owner/holder's bank 445, and/or one or more other entities.

The ATM owner/holder 440 may have a bank 445 that maintains a bank account for the ATM owner/holder 440. The ATM owner/holder's bank 545 may be the same as or different from the issuing bank 470. In one example, the ATM 300 is a kiosk-style ATM owned or leased by a merchant, such as a gas station or convenience store. In such an embodiment, although the merchant 440 may provide the money in the ATM 300, the ATM 300 may be operated by a host processor 430. In such an embodiment, the ATM 300 may communicate with the issuing bank 470 through the host processor 430. Where the transaction involves a withdrawal of cash from the ATM 300, the issuing bank 470 transfers funds to the host processor's bank 435 via, for example, an electronic funds transfer, and the host processor bank 435 then ACHs the funds to the merchant's bank account maintained by the merchant's bank 445. In this way, the merchant 440 is reimbursed for the funds dispensed at the ATM 300.

As illustrated in FIG. 4, in some embodiments of the invention, the user preferences 500 are held by the host processor 430 and/or the ATM owner/holder 440. In some such embodiments, one or both of these entities may hold the user preferences temporarily in their memory devices in order to communicate the user preferences from the issuing bank 470 to the ATM 300. In other embodiments, the user preferences 500 may be created by the user 450 dealing with the host processor 430 and/or the ATM holder/owner 440 instead of the issuing bank 470. In still other embodiments, the host processor 430 and the ATM holder/owner 440 never store or have access to the user preferences 500.

Numerous other entities may also be involved in embodiments of the present invention, but are not shown in FIG. 4 for the sake of clarity. For example, the system may involve an automated clearing house (ACH) and/or one or more other financial institutions involved in processing ATM transactions. Furthermore, although only a single representation of a network 410 is illustrated in FIG. 4, the network 410 may comprise a plurality of separate and discrete networks. For example, the network 410 that is used to communicate information between the issuing bank 470 and the ATM 300 may be the same or different than the network 410 used to communicate information between the issuing bank 470 and another entity illustrated in FIG. 4. The network 410 may include a LAN, WAN, and/or GAN. In this regard, the network 410 may include the Internet, an intranet, an extranet, a telephonic network, and/or a combination of these networks. The network 410 may also include a direct electrical, optical, or wireless connection between one or more of the entities and devices shown in FIG. 4.

FIG. 5 provides an illustration of exemplary user preferences 500, in accordance with an embodiment of the invention. These user preferences are provided to describe certain exemplary embodiments of the invention and, as such, embodiments of the invention are not limited to these user preferences unless specifically stated otherwise in the claims. Other user preferences and/or combinations of user preferences will be apparent to one of ordinary skill in the art in view of this disclosure.

As illustrated in FIG. 5, in some embodiments, the user 450 can establish denomination preferences 510 that specify a particular denomination that the user prefers to receive at the ATM 300. For example, a user may prefer to only receive a single denomination whenever the user withdraws money from an ATM and may specify, for example, that she wishes to receive only twenty dollar bills from all ATMs.

In some embodiments, the user 450 can establish cash withdrawal preferences 520 that relate to other aspects of cash withdrawals, such as the amount of cash withdrawals. For example, in one embodiment a user may withdraw the same amount of money, such as $100, almost every time she visits an ATM. In such an example, the user may prefer to have the ATM 300 ask her if she wants to withdraw $100 as the very first thing that appears on the ATM's display 330 after the user is authenticated. In still another example embodiment, the user could establish preferences that instruct the ATM 300 to automatically withdraw $100 or some other pre-defined amount from a particular account and dispense it to the user as soon as the user is authenticated, without even asking the user first. Such a preference may be useful to allow a user to reduce the amount of time spent at the ATM 300 when the user knows that they often go to the ATM 300 to perform the same transaction.

In some embodiments, the user 450 can establish bill folding preferences or other bill altering preferences 530 such as Braille imprinting preferences. For example, a visually impaired user may specify that the ATM 300 should dispense folded bills wherever possible where the bills are folded differently based on the denomination of the bill. In some embodiments, the bill folding preferences 530 not only include a preference for folded bills but also indicate a preference for a particular folding technique. In other embodiments, instead of folding, the ATM 300 may be configured to imprint Braille or other indicators onto each bill to indicate the denomination of the bill by, for example, pressing the indication into one side of the bill to create a raised indicator on the other side of the bill or by placing a sticker onto one side of the bill to create a raised pattern. The bill altering preferences 530 may establish a preference for receiving bills having these indications imprinted thereon.

In some embodiments, the user 450 can establish denomination order preferences 540 that instruct the ATM 300 to always dispense bill denominations in a particular order, such as from highest to lowest or lowest to highest. Such a preference may be useful to a visually impaired user to help the user know the denomination of dispensed bills.

In some embodiments, the user 450 can establish audio preferences 550 that indicate when the ATM 300 should output audible communication through the speaker 332 or other output devices 336. For example, a user may prefer to always receive audible communication that guides the user through the entire ATM usage process by, for example, reading prompts, questions, options, selections, and/or instructions displayed on the display 330 to the user to guide the user through each step in the process. In other embodiments, the user 450 may prefer to receive certain audio signals whenever a particular event happens. For example, a visually impaired user or other users may desire to have a particular tone or other audio issued from the ATM 300 whenever money is being dispensed or just before money is dispensed so that the user knows when to feel for and take the money from the ATM's cash dispensing device. In some embodiments, the user may request that different denominations be dispensed separately and that the ATM 300 outputs an audible statement of the denomination or different tones associated with different denominations. In such an embodiment, the ATM may pause between dispensing different denominations of bills long enough to allow a visually impaired user take the bills, identify the denomination, and fold the bill to their liking before having to take the next denomination of bill. In still other embodiments, tones may sound when the ATM is providing other user outputs or awaiting certain user inputs. Other users may prefer to request, via user preferences, that the ATM 300 not sound certain otherwise standard tones or other audible communications.

In some embodiments, the user 450 can establish personal device preferences 560 that indicate the user's preferences for having the ATM 300 interact with a user's personal device 454, such as a user's mobile telephone. In some embodiments of the invention, the ATM 300 is configured with a user personal device interface 334 that can communicate with some personal devices that may be held by the user to receive user input through the personal device or provide output to the user through the personal device. The personal device preferences 560 may indicate that the ATM 300 should try to communicate with a user's personal device 454 when the user is at the ATM and/or may specify the type of personal device 454 that the user has.

In some embodiments, the user 450 can establish user physical characteristic preferences 570 such as a user preference that indicates that the user has a visual impairment. This type of preference may indicate that the ATM 300 should use a particular alternative procedure when dealing with the user that addresses the user's particular physical characteristics, such as a process designed specifically with the visually impaired in mind that does not rely on the vision of the user.

In some embodiments, the user 450 can establish menu option preferences 580. For example, in one embodiment, the user create preferences that instruct the ATM 300 to display certain options in a particular order. For example, the user 450 may only ever use the ATM to make withdrawals from the user's checking account and the user may typically not make any deposits or withdrawals from the user's savings account. As such, the user may specify that the first screen to be presented after authentication be a screen asking how much money the user desires to withdraw from the user's checking account. However, the screen may also have an option that, if selected, can take the user to other options in case the user needs to perform other tasks not typically performed, such as deposits or withdrawals from the user's savings account. In other embodiments, the user may be able to establish preferences for other graphical user interface options, such as the color scheme or the font size of aspects of the graphical user interface.

In some embodiments, the user 450 can establish authentication preferences 590 that instruct the ATM 300 as to which authentication procedures to use. Some users may prefer to have the highest level of authentication available while others may choose to have the quickest or most convenient authentication procedures based on their particular needs. For example, some users may prefer to require biometric authentication where available while others may prefer the standard PIN authentication. Other users may desire to have more forms of authentication and may set up a preference that requires the ATM 300 to ask for a PIN and then to ask one or more security questions. The user preferences may allow the user to specify the security questions and/or answers or may instruct the bank to generate dynamic security questions based on the user's transaction history.

FIG. 6 provides an illustration of an exemplary ATM 300 and user 450, in accordance with an embodiment of the invention. Also illustrated is an example display 330, speaker 332, user input device 340, tactile user output device 336, transaction device reader 350, and cash dispenser 390. It will be appreciated that FIG. 6 is merely an illustration of one example of an ATM 300 and that other embodiments of the ATM 300 will take other forms and configurations.

FIG. 7 provides a flow diagram illustrating a process 700 of interacting with a user at an ATM based on pre-established user preferences, which may be performed by, for example, the ATM 300 of FIGS. 3, 4, and 6, in accordance with an embodiment of the invention. As illustrated by block 710, the ATM 300 identifies the user 450. For example, in one embodiment represented by block 712, the ATM 300 uses its transaction device reader 350 to read information from the user's transaction device 452 that can be used to uniquely identify the user or the user's account. For example, in one embodiment, a customer at an ATM swipes his or her bank card through the ATM's bank card reader and the ATM reads a magnetic stripe on the bank card.

In other example embodiments represented by block 714, the ATM 300 identifies the user 450 by using biometric scanning devices to read biometrics of the user that are then used to uniquely identify the user or the user's account. For example, in one embodiment the ATM 300 scans the fingerprint of the user and sends the scanned print to the issuing bank 470 where the issuing bank's computers identify one or more users or financial accounts associated with the print.

As represented by block 720, the ATM 300 then performs a process to authenticate the user 450. Authentication may involve, for example, the ATM 300 using its user interface to ask the user for a personal identification code, to ask the user one or more other security questions, to scan a user's fingerprint, face, hand, or iris, perform other biometric identification techniques, and/or the like. In one embodiment, using information read from the user's transaction device 452, the ATM 300 communicates with a remote server of the issuing bank 470 to determine customer account information 472 about an account identified from information read from the user's transaction device 452. The customer account information 472 includes authentication information 474 that the ATM 300 uses to verify the identity or authority of the user 450. For example, in one embodiment, after reading a user's bank card, an ATM asks the user for a personal identification number (PIN). The ATM then sends the information read from the magnetic stripe of a user's bank card and the user-supplied PIN over a financial transaction network to a remote server of the issuing bank that issued the bank card. If the entered PIN matches a PIN associated with the account determined from the bank card, then the issuing bank sends a communication to the ATM indicating that the user is authorized to make transactions involving the account associated with the bank card.

As represented by block 730, the ATM 300 also determines pre-established user preferences 500 associated with the user 450 or the user's account. For example, as represented by block 732, in one embodiment, the ATM 300 uses the transaction device reader 350 to read user preferences stored on the user's transaction device 452. For example, in one embodiment, after a user 450 establishes preferences with the issuing bank 470, the issuing bank 470 modifies the user's transaction device 452 or issues the user 450 a new transaction device 452 that has the user preferences 500 stored thereon. For example, the transaction device may have the user preferences encoded in a magnetic stripe, stored in another type of memory device, written on the card in a machine-readable format, etc. The ATM 300 may then be configured to read the user preferences 500 from the transaction device 452 and take actions to interact with the user in a non-standard way based on the user preferences 500.

As represented by block 734, in other embodiments of the invention, the ATM 300 determines user preferences 500 by using the user/user account identifying information obtained during step 710 and communicating it over the network 410 to a remote server, such as a server maintained by the issuing bank 470. The remote server then uses the identifying information to look up user preferences 500 associated with the identifying information in its memory system. The remote server then communicates these pre-established user preferences to the ATM 300 over the network 410.

As represented by block 740, the ATM 300 then interacts with the user based at least partially on the pre-established user preferences 500 obtained during step 730. As described above with regard to FIG. 5, the user preferences 500 can include a number of different types of preferences depending on the embodiment of the invention.

For example, as represented by block 741, in one embodiment of the invention, the ATM 300 dispenses only a certain denomination of bill based on the pre-established user preferences 500. For instance, a user may establish a user preference that indicates that the user desires to only receive twenty-dollar bills whenever the user withdraws money from an ATM. The user may simply like to carry twenty-dollar bills or the user may have a visual impairment and like to know that all of the bills dispensed by the ATM are twenty-dollar bills so that there will be no confusion as to the denomination of bills received from an ATM. Such a user preference is communicated to the ATM in response to the particular user being identified at the ATM and, in response, the ATM, which may be configured to dispenses bills of multiple denominations, including twenty-dollar bills, will only dispense twenty-dollar bills to this user. In some embodiments, if the ATM 300 does not have the requested bill denomination, the ATM 300 will inform the user 450 using the ATM's user interface (e.g., audio alerts, tactile alerts, visual alerts, and/or the like).

As represented by block 742, in one embodiment of the invention, the ATM 300 dispenses bill denominations in a particular order based on pre-established user preferences 500. For example, a user may establish a user preference that indicates that the user desires to have the ATM dispense bills so that like denominations are dispensed together, but groups of different denominations are dispensed separately and in order from highest to lowest denomination. This user preference is communicated to the ATM in response to the particular user being identified at the ATM. In response, the ATM, which may be configured to dispense bills of multiple denominations all at once, will, if possible, only dispense each denomination of bill separately from highest to lowest denomination.

As represented by block 743, in one embodiment of the invention, the ATM 300 automatically dispenses a particular sum of money based on the pre-established user preferences 500. For example, a user may desire to quickly receive $100 every time the user goes to an ATM. The user may be able to create such a user preference by specifying the amount and the account to the issuing bank which then stores this user preference and communicates it to the ATM in response to the particular user being identified at the ATM. In response, in one embodiment, the ATM immediately and automatically dispenses $100 after the user is authenticated at the ATM.

As represented by block 744, in one embodiment of the invention, the ATM 300 activates certain user input and/or output devices based on the pre-established user preferences 500. The user input or output device may be a speaker, a touchpad, a touch screen, a keypad, a tactile input or output device, a wireless transceiver, a microphone, a camera, a cash dispenser or input device, a check dispenser or input device, a light, and/or any other input or output device or combination of input and/or output devices. For example, the user preference may indicate that the user has a visual impairment. The user may be able to create such a user preference by informing the issuing bank of the visual impairment, which then stores this user preference and communicates it to the ATM in response to the particular user being identified at the ATM. In response, in one embodiment, the ATM uses input and/or output devices and/or procedures to interact with the user that are different than the standard devices and procedures and that are more suitable for communicating with someone with a visual impairment. For example, tactile and/or audible input and/or output devices may be activated instead of visual-based input and/or output devices. In another example, the display device of the ATM is made brighter and the font size, contrast, and clarity of the information displayed are increased.

As represented by block 745, in one embodiment the ATM 300 dispenses folded bills or bills with Braille or other physical modifications based on the pre-established user preferences 500. For example, a visually impaired user may normally have a difficult time knowing the denomination of bills dispensed from an ATM. In one embodiment, the user can create a visually impaired preference or a folded or Braille preference. When a user having such a preference is identified at the ATM, the ATM receives the preference and folds the dispensed bills based on the denomination. For example, the ATM may fold a ten-dollar bill in half lengthwise and fold a twenty-dollar bill in half widthwise. In some embodiments, the user may be able to create a user preference that instructs the ATM as to the specific folding technique that the user prefers. In some embodiments, the ATM can alter the physical configuration of the bill in other ways based on the user preference by, for example, printing or impressing Braille or other tactile characters onto each dispensed bill.

As represented by block 746, in one embodiment the ATM 300 interacts with the user's personal electronic device 454 based on the pre-established user preferences 500. For example, in one embodiment the user may create a user preference that indicates that the ATM, if possible, should communicate with the user's personal electronic device, such as the user's cell phone, and use the personal electronic device to receive input from and/or provide output to the user. For instance, a visually impaired user may prefer to use his or her cell phone as the user interface when dealing with the ATM because it is familiar and will not change from one ATM to the next. In some embodiments, the user preference also specifies which type of personal electronic device the user will use so that the ATM will use an appropriate communication protocol. Based on these preferences, the ATM, where equipped to do so, will try to communicate with the user's personal electronic device to send and receive user output and input.

As represented by block 748, in one embodiment the ATM 300 provides audio or tactile signals based on the pre-established user preferences 500. For example, in one embodiment the user establishes a preference that instructs the ATM to audibly announce the denomination of bills as they are dispensed from the ATM. In another embodiment, the user preference may instruct the user to communicate with the user using a tactile device such as a Braille device or vibrating device.

As represented by block 749, in one embodiment the ATM 300 provides the user with options based on the pre-established user preferences 500. For example, the user may typically perform the same several transactions at the ATM and, in one embodiment of the invention, is be able to create a user preference that creates a customized graphical user interface for the user that, for example, initially asks the user to select from one of the few transactions types that the user typically engages in at the ATM rather than initially displaying options for translation types that the user rarely engages in.

In other embodiments, the pre-established user preferences 500 include other preferences that instruct the ATM 300 to perform other tasks for the user that the ATM 300 may not typically provide to users without the existence of the user preference.

FIG. 8 provides a flow diagram illustrating another process 800 of interacting with a user at an ATM based on pre-established user preferences, which may be performed by, for example, the ATM 300 of FIGS. 3, 4, and 6, in accordance with an embodiment of the invention. Like the process 700 described herein above with respect to FIG. 7, and as represented by blocks 810 and 820, the ATM identifies the user (or user account) and determines any pre-established user preferences 500 based on the identity of the user (or user account). However, in the process 800 of FIG. 8, at least one pre-established user preference 500 is determined prior to authentication since, in the embodiment illustrated in FIG. 8, at least one pre-established user preference relates to authentication and a user's preference for a particular authentication procedure. As such, as represented by blocks 830 and 840, in some embodiments of the invention, interacting with the user at an ATM based on pre-established user preferences involves authenticating the user using authentication procedures that are based at least partially on the user's pre-established preferences 500. For example, some users may prefer to have a more rigorous authentication procedure requiring, for example, a payment device, PIN, and several personalized security questions, while another user may prefer to have a quicker authentication procedure, such as a payment device and a PIN only, or an iris scan.

FIG. 9 provides a flow diagram illustrating a process 900 of establishing a user's ATM preferences, which may be performed by, for example, the issuing bank 470 of FIG. 4, in accordance with an embodiment of the invention. More particularly, the procedure 900 may be performed by a computer system of the issuing bank 470, where the computer system comprises a user interface for communicating with a user over a network, a processor, and a memory device for storing customer account information, customer ATM preferences, and computer-executable program code for instructing the processor to perform the steps described herein with respect FIG. 9.

As represented by block 910, the issuing bank 470 provides an online banking portal over the Internet or other network. Such an online banking portal may be configured to allow a user to access one or more of the user's financial accounts and view transaction histories and/or make transactions involving the account.

As represented by block 920, the issuing bank 470 allows the user to sign into the user's online banking account using the online banking portal. The sign-in procedures generally require authentication of the user. For example, in one embodiment of the invention, the user signs into the online banking portal by providing a user-created identifier and passcode.

As represented by block 930, in one embodiment of the invention, the issuing bank 470 uses the online banking portal to provide the user with user preference options pertaining to ATM usage. For example, the online banking portal may have a link from the user's account overview web page to a web page that allows a user to create and/or select user preferences pertaining to ATM usage. In some embodiments, the online banking portal provides only certain user preferences that the user can choose between, for example, by clicking on the option. In some instances, however, the user is provided with more freedom with regard to the user preferences and can create the user preferences by providing other types of input to the online banking portal. For example, in embodiments of the invention where the user can create a customized graphical user interface, the online banking portal may provide an online workshop where the user can drag and drop different graphics, options, menus, and procedures into a graphical view of the ATM's user interface. In still other embodiments, a user may be able to call a certain telephone number or otherwise connect to a bank employee or voice recognition system to instruct the bank employee or voice recognition system to create particular user preferences for the user.

As represented by block 940, once the issuing bank 470 receives user selections or other input specifying one or more user preferences pertaining to ATM usage, the issuing bank 470 stores user preferences in a memory device and associates the preferences in the memory device with the user or user's account information also stored therein, as represented by block 950. As represented by block 960, in one embodiment of the invention, the issuing bank 470 then issues a transaction device 452 to the user 450 having the user-selected user preferences 500 stored thereon. For example, the bank may issue a bank card having indicators of one or more user preferences stored in the magnetic strip of the bank card. As represented by block 970, in other embodiments of the invention, the issuing bank 470 provides the user-selected user preferences 500 to the ATM 300 via the network 410 based on identification information obtained by the ATM 300 that identifies the user 450 or the user's account with the issuing bank 470.

As will be appreciated by one of skill in the art, the present invention may be embodied as a method, apparatus (including a system), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; or a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer-readable instructions for carrying out operations of the present invention may be written in an object-oriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products, according to embodiments of the invention. It will be understood that blocks of the flowchart illustrations and/or block diagrams shown in FIGS. 1-5 and 7-9, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a particular machine, such that the instructions, which execute via the processor of the computer or other programmable data processing apparatus, create a particular mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An automated teller machine comprising:
    a user interface configured to receive user identifying information from a user; and
    a processing device operatively coupled to the user interface and configured to:
        use the user identifying information to determine a pre-established user preference associated with one or more physical characteristic of the users;
        use the user interface to interact with the user based at least partially on the pre-established user preference associated with the one or more physical characteristics of the user;
    a cash repository comprising a plurality of different denominations of bills of cash stored therein; and
    a cash dispenser configured to dispense the different denominations of the bills of cash stored in the cash repository, wherein the processing device is further configured to:
        use the cash dispenser to physically alter configurations of the bills of cash based at least partially on the pre-established user preferences associated with the one or more physical characteristics of the user; and
        dispense to the user the bills of cash having the altered physical configurations.

2. The automated teller machine of claim 1, further comprising:
    a network communication interface, wherein the processing device is configured to use the user identifying information to determine the pre-established user preference by communicating with a remote computing device based on the user identifying information and obtaining the pre-established user preference from the remote computing device.

3. The automated teller machine of claim 1, wherein the processing device is configured to use the user identifying information to determine the pre-established user preference by reading the pre-established user preference in the user identifying information.

4. The automated teller machine of claim 1, wherein the user identifying information comprises information received from a transaction device held by the user.

5. The automated teller machine of claim 4, wherein the transaction device comprises a bank card.

6. The automated teller machine of claim 4, wherein the transaction device comprises a mobile computing device.

7. The automated teller machine of claim 1, wherein the user identifying information comprises biometrics of the user.

8. The automated teller machine of claim 1, wherein the user identifying information comprises information identifying a financial account associated with the user.

9. The automated teller machine of claim 1, wherein the pre-established user preference is defined by the user.

10. The automated teller machine of claim 1,
    wherein the processing device is configured to use the cash dispenser to dispense cash based on the pre-established user preference.

11. The automated teller machine of claim 1,
    wherein the processing device is configured to use the cash dispenser to dispense only a single denomination of cash to the user based on the pre-established user preference.

12. The automated teller machine of claim 1,
    wherein the user interface comprises an audio output device, and
    wherein the processing device is configured to use the audio output device to generate an audio signal based on the pre-established user preference associated with the one or more physical characteristics of the user and a denomination of the cash dispensed by the cash dispenser.

13. The automated teller machine of claim 1, further comprising:
    a memory comprising a first set of user interface instructions configured to instruct the processing device to use the user interface according to a first set of rules, and a second set of user interface instructions configured to instruct the processing device to use the user interface according to a second set of rules different from the first set of rules,
    wherein the processing device is configured to use the second set of user interface instructions instead of the first set of user interface instructions based at least partially on the pre-established user preference associated with the one or more physical characteristics of the user.

14. The automated teller machine of claim 13, wherein the pre-established user preference is associated with a visual impairment of the user, wherein the first set of user interface instructions comprise a default set of user interface procedures, and wherein the second set of user interface instructions comprise a set of user interface procedures tailored for a visually impaired user.

15. The automated teller machine of claim 1, wherein the processing device is configured to use the user interface to interact with the user based at least partially on the pre-established user preference by initiating an authentication procedure based on the pre-established user preference.

16. The automated teller machine of claim 1, wherein the processing device is configured to use the user interface to interact with the user based at least partially on the pre-established user preference by attempting to communicate with a personal device associated with the user based on the pre-established user preference.

17. The automated teller machine of claim 1, wherein the processing device is configured to use the user interface to interact with the user based at least partially on the pre-established user preference by presenting the user with options in an order based on the pre-established user preference.

18. A computer implemented method comprising:
providing computer program code stored on a non-transitory computer readable medium and a computer processing device in communication with the computer readable medium, wherein said computer program code is configured to cause said computer processing device to perform the following operations when said computer processing device operates said computer program code:
receiving electronic identifying information obtained by an automated teller machine;
using the electronic identifying information to identify a user or an account;
identifying a pre-established user preference associated with one or more physical characteristic of the user; and
interacting with the user at the automated teller machine based at least partially on the pre-established user preference associated with the one or more physical characteristics of the user;
using a cash dispenser to physically alter configurations of bills of cash based at least partially on the pre-established user preferences associated with the one or more physical characteristics of the user; and
dispensing to the user the bills of cash having the altered physical configurations.

19. The computer implemented method of claim 18, wherein receiving electronic identifying information obtained by the automated teller machine comprises:
reading a transaction device using a transaction device reader of the automated teller machine.

20. The computer implemented method of claim 18, wherein using the electronic identifying information to identify the user or the account, and identifying the pre-established user preference associated with the user or the account comprises:
sending the identifying information to a remote server to identify the user or the account; and
receiving the pre-established user preference from the remote server based on the identifying information.

21. The computer implemented method of claim 18, wherein receiving electronic identifying information obtained by the automated teller machine comprises:
receiving the identifying information from a remote automated teller machine via a network.

22. The computer implemented method of claim 18, wherein interacting with the user at the automated teller machine based at least partially on the pre-established user preference comprises:
communicating the pre-established user preference to the automated teller machine so that the automated teller machine will interact with the user based at least partially on the pre-established user preference.

23. The computer implemented method of claim 18, wherein identifying the pre-established user preference associated with the user or the account comprises reading the pre-established user preference from the memory of a transaction device presented to the automated teller machine.

24. The computer implemented method of claim 18, wherein interacting with the user at the automated teller machine based at least partially on the pre-established user preference comprises:
dispensing only a single denomination of cash to the user at the automated teller machine based at least partially on the pre-established user preference.

25. The computer implemented method of claim 18, wherein interacting with the user at the automated teller machine based at least partially on the pre-established user preference comprises:
dispensing different denominations of cash at the automated teller machine in a particular order based at least partially on the pre-established user preference associated with the one or more physical characteristics of the user.

26. The computer implemented method of claim 18, wherein interacting with the user at the automated teller machine based at least partially on the pre-established user preference associated with the one or more physical characteristics of the user comprises:
generating an audio signal based at least partially on the pre-established user preference associated with the one or more physical characteristics of the user and a denomination of cash dispensed by the automated teller machine.

27. The computer implemented method of claim 18, wherein interacting with the user at the automated teller machine based at least partially on the pre-established user preference associated with the one or more physical characteristics of the user comprises:
providing a first set of user interface instructions configured to instruct the automated teller machine to use its user interface according to a first set of rules;
providing a second set of user interface instructions configured to instruct the automated teller machine to use its user interface according to a second set of rules different from the first set of rules; and
using the second set of user interface instructions instead of the first set of user interface instructions based at least partially on the pre-established user preference associated with the one or more physical characteristics of the user.

28. A computer program product comprising a non-transitory computer-readable medium, the computer-readable medium comprising one or more computer-executable program code portions stored therein that, when executed by a computer, cause the computer to:
receive electronic identifying information obtained by an automated teller machine;
use the identifying information to identify a pre-established user preference associated with the one or more physical characteristics of the user; and
interact with the user at the automated teller machine based at least partially on the pre-established user preference associated with the one or more physical characteristics of the user;
use a cash dispenser to physically alter configurations of bills of cash based at least partially on the pre-established user preferences associated with the one or more physical characteristics of the user;
dispense to the user the bills of cash having the altered physical configurations.

29. The computer program product of claim 28, wherein the one or more computer-readable program code portions, when executed by the computer, cause the computer to:

read the identifying information from a transaction device using a transaction device reader of the automated teller machine.

30. The computer program product of claim 28, wherein the one or more computer-readable program code portions, when executed by the computer, cause the computer to:
send the identifying information to a remote server and receive the pre-established user preference from the remote server based on the identifying information.

31. The computer program product of claim 28, wherein the one or more computer-readable program code portions, when executed by the computer, cause the computer to:
receive the identifying information from a remote automated teller machine via a network.

32. The computer program product of claim 28, wherein the one or more computer-readable program code portions, when executed by the computer, cause the computer to:
communicate the pre-established user preference to the automated teller machine so that the automated teller machine will interact with the user based at least partially on the pre-established user preference.

33. The computer program product of claim 28, wherein the one or more computer-readable program code portions, when executed by the computer, cause the computer to:
read the pre-established user preference from the memory of a transaction device presented to the automated teller machine.

34. The computer program product of claim 28, wherein the one or more computer-readable program code portions, when executed by the computer, cause the computer to:
dispense cash at the automated teller machine based at least partially on the pre-established user preference.

35. The computer program product of claim 28, wherein the one or more computer-readable program code portions, when executed by the computer, cause the computer to:
dispense only a single denomination of cash to the user at the automated teller machine based at least partially on the pre-established user preference.

36. The computer program product of claim 28, wherein the one or more computer-readable program code portions, when executed by the computer, cause the computer to:
generate an audio signal based at least partially on the pre-established user preference associated with the one or more physical characteristics of the user and a denomination of cash dispensed by the automated teller machine.

37. The computer program product of claim 28, wherein the one or more computer-readable program code portions, when executed by the computer, cause the computer to:
provide a first set of user interface instructions stored therein and configured to instruct the automated teller machine to use its user interface according to a first set of rules; and
provide a second set of user interface instructions stored therein and configured to instruct the automated teller machine to use its user interface according to a second set of rules different from the first set of rules; and
use the second set of user interface instructions instead of the first set of user interface instructions based at least partially on the pre-established user preference associated with the one or more physical characteristics of the user.

38. An apparatus comprising:
a user interface configured to receive identifying information obtained by an automated teller machine;
a processing device configured to use the identifying information to:
identify a pre-established user preference associated with the one or more physical characteristics of the user; and
use the user interface to interact with the user at the automated teller machine based at least partially on the pre-established user preference associated with the one or more physical characteristics of the user;
a cash repository comprising a plurality of different denominations of bills of cash stored therein; and
a bills dispenser configured to dispense the different denominations of the bills of cash stored in the cash repository, wherein the processing device is further configured to:
use the cash dispenser to physically alter configurations of the bills of cash based at least partially on the pre-established user preferences associated with the one or more physical characteristics of the user; and
dispense to the user the bills of cash having the altered physical configurations.

39. The apparatus of claim 38, wherein the processing device configured to use the user interface to interact with the user at the automated teller machine based at least partially on the pre-established user preference is further configured to:
provide options to the user at the automated teller machine based at least partially on the pre-established user preference.

40. The apparatus of claim 38, wherein the processing device configured to use the user interface to interact with the user at the automated teller machine based at least partially on the pre-established user preference associated with the one or more physical characteristics of the user is further configured to:
issue audible signals at the automated teller machine based at least partially on the pre-established user preference associated with the one or more physical characteristics of the user.

41. The apparatus of claim 38, wherein the processing device configured to use the user interface to interact with the user at the automated teller machine based at least partially on the pre-established user preference is further configured to:
authenticate the user at the automated teller machine based at least partially on the pre-established user preference.

42. The automated teller machine of claim 1, wherein the cash dispenser physically alters the bills of cash according to a technique for altering physical configurations of bills of cash, wherein the user indicates the technique as a preference associated with the one or more physical characteristics of the user.

43. The computer-implemented method of claim 18, wherein the cash dispenser physically alters the bills of cash according to a technique for altering physical configurations of bills of cash, wherein the user indicates the technique as a preference associated with the one or more physical characteristics of the user.

44. The computer program product of claim 28, wherein the cash dispenser physically alters the bills of cash according to a technique for altering physical configurations of bills of cash, wherein the user indicates the technique as a preference associated with the one or more physical characteristics of the user.

45. The apparatus of claim 38, wherein the bills dispenser physically alters the bills of cash according to a technique for altering physical configurations of bills of cash, wherein the user indicates the technique as a pre-established preference associated with the one or more physical characteristics of the user.

46. The automated teller machine of claim 42, wherein the user may pre-establish the technique for altering the physical configurations of bills by indicating the technique selected from a group consisting of Braille imprinting on the bills, folding the bills, folding the bills of different denominations in a user-specified manner, applying a scent to the bills, placing a sticker on the bills, or imprinting a tactile denomination indicator on the bills.

47. The computer-implemented method of claim 43, wherein the user may pre-establish the technique for altering the physical configurations of bills by indicating the technique selected from a group consisting of Braille imprinting on the bills, folding the bills, folding the bills of different denominations in a user-specified manner, applying a scent to the bills, placing a sticker on the bills, or imprinting a tactile denomination indicator on the bills.

48. The computer program product of claim 44, wherein the user may pre-establish the technique for altering the physical configurations of bills by indicating the technique selected from a group consisting of Braille imprinting on the bills, folding the bills, folding the bills of different denominations in a user-specified manner, applying a scent to the bills, placing a sticker on the bills, or imprinting a tactile denomination indicator on the bills.

49. The apparatus of claim 45, wherein the user may pre-establish the technique for altering the physical configurations of bills by indicating the technique selected from a group consisting of Braille imprinting on the bills, folding the bills, folding the bills of different denominations in a user-specified manner, applying a scent to the bills, placing a sticker on the bills, or imprinting a tactile denomination indicator on the bills.

\* \* \* \* \*